June 12, 1956  T. T. BUNCH  2,750,461
APPARATUS FOR METERING CONDUCTIVE MATERIALS
Filed June 1, 1953

INVENTOR
T. T. BUNCH
BY
ATTORNEY

United States Patent Office 2,750,461
Patented June 12, 1956

2,750,461

APPARATUS FOR METERING CONDUCTIVE MATERIALS

Tillman T. Bunch, near Ashland, Md., assignor to Western Electric Company, Incorporated, New York, N. Y., a corporation of New York Application June 1, 1953, Serial No. 358,718

6 Claims. (Cl. 200—61.13)

This invention relates to apparatus for metering conductive materials, and more particularly to apparatus for measuring the amount of conductive material passed through the apparatus.

An object of this invention is to provide new and improved apparatus for metering conductive materials.

Another objects of this invention is to provide new and improved apparatus for measuring the amount of conductive materials passing through the apparatus.

Other objects of this invention will become apparent as the specification proceeds.

Apparatus illustrating certain features of the invention may include a pair of pole pieces having opposed, spaced pole faces rotatable freely about a common axis of rotation, and a source of magnetomotive force for producing a flux within said pole pieces, whereby a magnetic field is created in the air gap between the pole faces which reacts with the eddy currents induced in a conductive material moving through and cutting said magnetic field to cause an angular displacement of the pole pieces about their axis of rotation.

Figure 1:
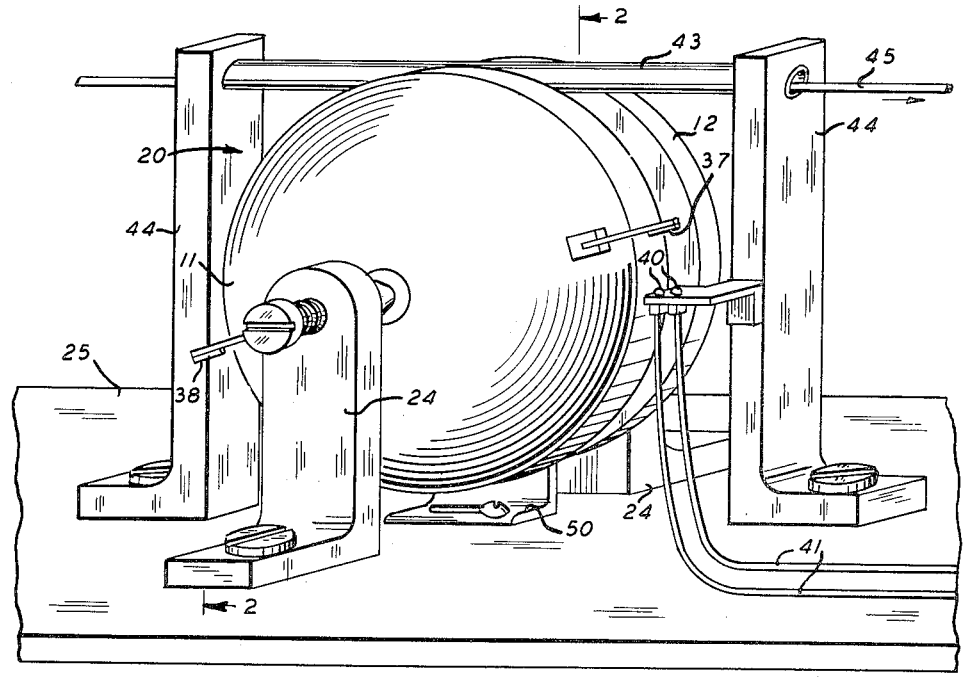
Figure 2:
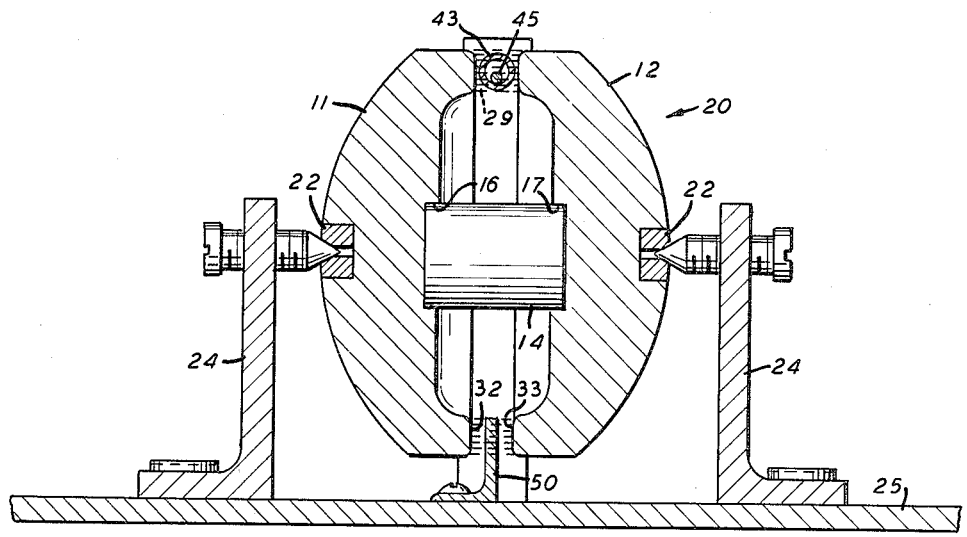

A complete understanding of this invention may be had from the following detailed description of apparatus forming a specific embodiment thereof, when read in conjunction with the appended drawings, in which:

Fig. 1 is a perspective view of an apparatus embodying the invention, with parts thereof broken away for clarity, and Fig. 2 is a vertical section taken along line 2—2 of Fig. 1.

Referring now to Fig. 1, there is shown a device for metering conductors of indefinite length. This device includes a pair of spaced, opposed, dish-shaped pole pieces 11 and 12 secured to the opposite ends of a cylindrical permanent magnet 14. The ends of the magnet 14 are force-fitted into complementary bored portions 16 and 17, respectively, formed in the pole pieces 11 and 12, respectively. The permanent magnet 14 preferably is made of a conventional magnetic material having a very high magnetic coercive force, such as "Alnico #5," or the like. The dish-shaped pole pieces 11 and 12 preferably are made of a paramagnetic material having a high saturation characteristic, such as cobalt iron, or the like.

The assembled pole pieces 11 and 12, and the magnet 14, which will hereinafter be referred to as the magnet assembly, designated generally as 20, are supported rotatably on substantially frictionless jewel bearings 22—22 between upright brackets 24—24 made of a nonmagnetic material, such as aluminum or the like. The brackets 24—24 are secured to a base 25 made of a nonmagnetic material, such as aluminum or the like. The assembly 20 is balanced precisely so that the sum of the static moments about its axis of rotation, due to the weight thereof, is zero for any angular position.

The permanent magnet 14 functions as a source of magnetmotive force and produces a flux, indicated schematically at 29 in Fig. 2, within the pole pieces 11 and 12. The flux 29 passes mainly through the annular air gap between opposed annular pole faces 32 and 33 of the pole pieces 11 and 12, respectively. The pole faces 32 and 33 are tapered to increase the flux density across the air gap and to reduce the leakage flux. By proper design of the pole pieces 11 and 12 a relatively low flux density is maintained within the pole pieces except for the portions immediately adjacent to the pole faces 32 and 33, thereby holding the leakage flux to a minimum.

Mounted at diametrically opposite positions on the pole piece 12 are a radially projecting contactor 37 and a counterweight 38 of identical design and weight. The contactor 37 is designed to bridge a pair of contacts 40—40 when the assembly 29 assumes a predetermined angular position. The contacts 40—40 when bridged by the contactor 37 complete an electrical circuit, a portion of which is indicated by electrical leads 41—41. The counterweight 38 is provided to maintain the critical balance of the assembly 20 for any angular position thereof.

A tubular guide 43 made preferably of a nonmagnetic material, such as glass, "Lucite," or the like, is horizontally supported by members 44—44 so that it passes between the pole faces 32 and 33 of the pole pieces 11 and 12, respectively. The longitudinal axis of the guide 43 is oriented substantially perpendicularly to the plane of the vertical section shown in Fig. 2, and preferably is equidistant from the pole faces 32 and 33. The guide 43 serves to guide a conductor 45 which is to be metered through the flux crossing the air gap between the opposed pole faces 32 and 33 and to assure that the spacing of the conductor from the axis of rotation of pole pieces does not change. In view of the perpendicular orientation of the guide 43 with respect to the magnetic flux across the air gap, it is manifest that the direction of movement of the conductor 45 through the guide is perpendicular to the magnetic field.

Adjustably mounted on the base is a damping plate 50 made of nonmagnetic, electrically conductive sheet material, such as aluminum or the like. The damping plate 50 extends between the opposed pole faces 32 and 33, and may be positioned adjustably to vary the area thereof extending into the magnetic field across the air gap.

Operation

For the purpose of illustrating the operation of the metering device shown in Fig. 1, it will be assumed that the conductor 45 to be passed through the guide 42 is a continuous length of copper wire. It will be apparent that the movement of the conductor 45 within and perpendicular to the magnetic field across the air gap creates eddy currents within the conductor. These eddy currents induced in the conductor 45 react with the flux across the air gap to resist all relative motions between the conductor and the rotatable magnet assembly 20. The reactions between the flux across the air gap and the induced eddy currents in the conductor 45, due to the longitudinal component of the relative movement, are translated solely into forces tending to rotate the rotatable magnet assembly 20 in accordance with the well-known laws of magnetism.

The reactions between the flux across the air gap and the induced eddy currents in the conductor 45, due to the relative movement components at 90° to longitudinal, are translated into forces equal and opposite, forming a force couple proportional solely to the angular movement of assembly 20, thus damping such rotation. The work which is expended as a consequence of these reactions is, in accordance with these laws, directly proportional to the amount of the conductive material passing perpendicularly through the magnetic field. Thus, assuming that the conductor 45 is of a substantially uniform diameter and substantially homogeneous in composition, the passage of a unit length thereof through the guide 43 perpendicularly disposed in the magnetic field across the air gap imparts a predetermined amount of rotational energy to the assembly 20.

Since the damping plate 50 extends into the annular magnetic field, any angular movement of the assembly 20 likewise induces eddy currents within that portion of the damping plate through which the flux crossing the air gap passes. The reaction of the eddy currents induced in the damping plate with the flux across the air gap creates a damping force in opposition to the angular movement of the assembly 20. Hence, the energy tending to rotate the assembly 20, which is imparted to the assembly by the reaction between the eddy currents induced in the advancing conductor and the flux across the air gap, is dissipated in movement against the reaction of the flux with the eddy currents induced in the damping plate in addition to the damping reactions previously described. This damping reaction between the flux and the eddy currents induced in the damping plate 50 is likewise directly proportional to the angular displacement of the assembly 20. Thus, it follows that the angular displacement of the magnet assembly 20 will be directly proportional to the length of the copper conductor 45 advanced through the conduit 42.

As previously mentioned, the position of the damping plate 50 is adjustable longitudinally so that the area of the plate threaded by the flux of annular magnetic field between the pole faces 22 and 23 may be varied to increase or decrease the damping reaction to a predetermined angular displacement of the assembly 20. It is apparent that by adjusting the position of the damping plate 50, the metering device may be calibrated so that the passage of a predetermined length of the conductor 45 will result in a predetermined angular displacement of the assembly, which for the purpose of this illustration will be assumed to be 90 degrees.

At the start of a metering operation, in which it is desired that an electrical circuit including the contacts 40—40 be completed upon the passage of the predetermined length of conductor 45, the contactor 37 is displaced angularly by 90 degrees counterclockwise (as viewed in Fig. 1) from the position wherein it bridges the contacts. The conductor 45 then is advanced from left to right, as viewed in Fig. 1, through the guide 43 with a resulting clockwise angular displacement of the assembly, which is directly proportional to the length of the conductor 45. Upon the passage of a length of the conductor 45 equal to the predetermined length, the contactor 47 will have rotated 90° clockwise to the position wherein the contacts 40—40 are bridged by the contactor to complete an electrical circuit which may include an annunciator or other signaling device (not shown) to give an indication to the operator.

It will be understood that the conductor 45, made of copper wire, is merely an illustrative example of a conductive material capable of being metered by the above-described apparatus and was selected merely to facilitate a description of the operation of the apparatus. In accordance with the teachings of this invention the conductive material to be metered may be in any form (i. e., solid, granular, or liquid), the essential requirement being only that such material must be electrically conductive. Manifestly, the material does not have to assume a circular cross section, since the apparatus is equally capable of metering conductors having any type of cross section (e. g., square, rectangular, etc.). It will be noted further that, in the case of filamentary conductive materials, the material may be covered with an insulating covering, since such an insulating covering would have no effect on the magnetic field or the induced eddy currents.

It will be understood that the invention is not limited to the heretofore described specific embodiment thereof, and that various modifications may be made within the spirit and scope of the invention.

What is claimed is:

1. Apparatus for metering electrically conductive materials, which comprises a pair of pole pieces having opposed, spaced, annular pole faces, means for rotatably supporting the pole pieces for rotation freely about a common axis concetnric with respect to the annular pole faces, a source of magnetomotive force for producing a magnetic flux within said pole pieces to create an annular magnetic field across the air gap between the pole faces, means for guiding a moving electrically conductive material along a fixed path between the pole faces substantially perpendicular to the magnetic field and at a fixed distance from the axis of rotation of the pole pieces, said magnetic field reacting with eddy currents induced in the moving electrically conductive material to cause angular displacement of the pole pieces about their axis of rotation, eddy current damping means tending to resist said angular displacement of the pole pieces, and means rotatable with one of the pole pieces for indicating the degree of angular displacement thereof.

2. Apparatus for metering electrically conductive materials, which comprises a pair of pole pieces having opposed, spaced, annular pole faces, means for rotatably supporting the pole pieces for rotation freely about a common axis concentric with respect to the annular pole faces, a source of magnetomotive force for producing a magnetic flux within said pole pieces to create an annular magnetic field across the air gap between the pole faces, means for guiding an electrically conductive material along a fixed path between the pole faces substantially perpendicular to the magnetic field and at a fixed distance from the axis of rotation of the pole pieces, said magnetic field reacting with eddy currents induced in the moving electrically conductive material to cause angular displacement of the pole pieces about their axis of rotation, eddy current damping means tending to resist said angular displacement of the pole pieces, means positioned on the pole piece for rotation therewith for indicating the degree of angular displacement thereof, and an electrical contactor mounted fixedly on one of the pole pieces for angular movement therewith, said contactor being arranged to complete an electric circuit when the pole pieces assume a predetermined angular position.

3. Apparatus for metering an electrically conductive material, which comprises a bar magnet, a pair of paramagnetic, dish-shaped pole pieces mounted coaxially on opposite poles of the magnet and having opposed, annular pole faces spaced from each other by an air gap, means for rotatably supporting the bar magnet and attached pole pieces for rotation freely about a common axis of rotation concentric with respect to the annular pole faces, said bar magnet producing a magnetic flux within said pole pieces to create an annular magnetic field across the air gap between the pole faces, means for guiding an electrically conductive material along a fixed path through the air gap between the pole faces substantially perpendicular to the magnetic field and at a fixed distance from the axis of rotation of the pole pieces, said magnetic field reacting with eddy currents induced in the moving conductive material to cause angular displacement of the pole pieces about their axis of rotation, eddy current damping means tending to resist said angular displacement of the pole pieces, stationary electrical contact means mounted adjacent to the rotatable pole pieces, and electrical contact means mounted on the pole pieces for rotation therewith and arranged to complete an electrical circuit with the stationary contact means when the pole pieces assume a predetermined angular displacement.

4. Apparatus for metering an electrically conductive material, which comprises a bar magnet, a pair of paramagnetic, dish-shaped pole pieces mounted coaxially on opposite poles of the magnet and having opposed, annular pole faces spaced from each other by an air gap, means for rotatably supporting the bar magnet and attached pole pieces for rotation freely about a common axis of rotation concentric with respect to the annular pole faces, said bar magnet producing a magnetic flux within said pole pieces to create an annular magnetic field across the air gap between the pole faces, means for guiding an electrically conductive material along a fixed path through the air gap between the pole faces substantially perpendicular to the magnetic field and at a fixed distance from the axis of rotation of the pole pieces, said magnetic field reacting with eddy currents induced in the moving conductive material to cause angular displacement of the pole pieces about their axis of rotation, eddy current damping means tending to resist said angular displacement of the pole pieces, stationary electrical contact means mounted adjacent to one of the rotatable pole pieces, movable electrical contact rotatable with one of the pole pieces and arranged to complete an electrical circuit with the stationary contact means when the pole piece assumes a predetermined angular displacement, and a counterweight mounted on the pole piece diametrically opposite to the movable electrical contact for maintaining the critical balance of the bar magnet and attached pole pieces with respect to their common axis of rotation.

5. Apparatus for metering electrically conductive materials, which comprises a pair of pole pieces having opposed, spaced, annular pole faces, means for rotatably supporting the pole pieces for rotation freely about a common axis concentric with respect to the annular pole faces, a source of magnetomotive force for producing a magnetic flux within said pole pieces to create an annular magnetic field across the air gap between the pole faces, a tubular guide for guiding an electrically conductive material along a fixed path between the pole faces substantially perpendicular to the magnetic field and at a fixed distance from the axis of rotation of the pole pieces, said magnetic field reacting with eddy currents induced in the moving electrically conductive material to cause angular displacement of the pole pieces about their axis of rotation, a nonmagnetic, electrically conductive damping plate positioned between the annular pole faces so that at any angular displacement of the pole pieces a portion of the flux across the air gap threads through a predetermined area of said damping plate, whereby rotational movements of the pole pieces are resisted as a result of eddy currents induced in the damping plate, and means rotatable with one of the pole pieces for indicating the degree of angular displacement thereof.

6. Apparatus for metering electrically conductive materials, which comprises a pair of pole pieces having opposed, spaced, annular pole faces, means for rotatably supporting the pole pieces for rotation freely about a common axis concentric with respect to the annular pole faces, a source of magnetomotive force for producing a magnetic flux within said pole pieces to create an annular magnetic field across the air gap between the pole faces, a tubular guide for guiding an electrically conductive material along a fixed path between the pole faces substantially perpendicular to the magnetic field and at a predetermined distance from the axis of rotation of the pole pieces, said magnetic field reacting with eddy currents induced in the moving electrically conductive material to cause angular displacement of the pole pieces about their axis of rotation, a nonmagnetic, electrically conductive damping plate mounted adjacent to the pole pieces and positioned between the annular pole faces so that at any angular displacement of the pole pieces a portion of the flux across the air gap threads through a predetermined area of said damping plate, whereby rotational movements of the pole pieces are resisted as a result of eddy currents induced in the damping plate, means for adjustably positioning the damping plate to change the area of the damping plate extending into the magnetic field across the air gap, and means rotatable with one of the pole pieces for indicating the degree of angular displacement thereof.

References Cited in the file of this patent

UNITED STATES PATENTS

| | | |
|---|---|---|
| 1,309,390 | Young | July 8, 1919 |
| 2,596,349 | Butler | May 13, 1952 |